a
3,728,248
APPARATUS FOR USE IN AN IMPROVED ELECTRO-DIALYSIS PROCESS

Roberto Passino, Rome, and Gianfranco Boari, Bari, Italy, assignors to Consiglio Nazionale Delle Ricerche, Rome, Italy
No Drawing. Original application Nov. 18, 1968, Ser. No. 776,821, now Patent No. 3,637,480. Divided and this application Jan. 17, 1972, Ser. No. 218,454
Int. Cl. B01d *13/02;* C02b *1/82*
U.S. Cl. 204—301  4 Claims

ABSTRACT OF THE DISCLOSURE

A process and apparatus for the desalination of salt water employing separate sodium and hydrogen form cation exchange resins to soften, to dealkalize and to partially deionize the said water prior to substantial demineralization by electrodialysis. The salt concentrated waste stream from the electrodialysis cell may be employed to regenerate the sodium form exchange resin that becomes exhausted during the softening step.

---

This is a division of application Ser. No. 776,821, filed on Nov. 18, 1968, now U.S. Pat. 3,637,480.

As well known, water desalting by electro-dialysis occurs by ion removal through selective diaphragms under the effect of an electric field.

It is also known that in an electro-dialysis unit the separation energy required is much larger (say from 10 to 20 times) than minimum theoretical energy, said energy being inversely proportional to current efficiency and directly proportional to desalting degree, unit resistance and current density.

(1) Current efficiency, that is the ratio of theoretical current intensity as given by Faraday's law and actual current intensity, is affected by the following factors:

(a) short circuit losses in connections between the cells;
(b) transport losses (co-ion transport, natural osmosis, salt diffusion in a reverse direction);
(c) transport losses due to transfer of $H^+$ and $OH^-$ ions resulting from water dissociation.

In actual plants current efficiency is higher than 90%.

(2) As experimentally shown, ⅔ of the unit resistance is due to concentration and ohmic polarizations.

Concentration polarization is due to the different transport number for ions on the solution and in the diaphragm, causing ion packing up on one side of the diaphragm and depletion on the other side of said diaphragm. On ion passage, the diffusion type of resistance increases as the concentration gradient increases and, therefore, the higher the current density the greater the difference between transport numbers in solution and in the diaphragm.

Additionally, concentration polarization can provide a further increase in resistance owing to high concentrations of some ions in the film, in this case resulting in insoluble salts being precipitated and a formation, of thin gaseous layers adhering to the diaphragm, such salts and thin gaseous layers having an extremely high type of localized resistance, which is referred to as resistance of ohmic polarization.

Such undesired phenomena are enhanced by local overheatings due to Joule effect as a result of precipitation formations and to some extent can be reduced either by increasing the turbulence in the solution contacting the diaphragms, or by acid introduction.

(3) Plant capacity is directly bound to current density, the practical value of which is however kept at a fraction of about 80% of the limiting current density, this in order not to unduly enhance the previously set forth polarization phenomena.

Initially the current density will linearly increase as the potential differential applied to the electrodes increases; then this current density will remain substantially constant even while considerably raising the applied voltage. This value is the above-mentioned limit value for the current density.

The present invention substantially comprises a pretreatment system for supply water in an electro-dialysis plant, where said water has an alkaline content, which pretreatment changes the composition of the material dissolved therein, allowing:

to reduce the resistances of concentration polarization and ohmic polarization;
to avoid scale forming by salt deposit;
to remove from supply water the materials of a colloidal character which would otherwise deposit on the diaphragms;
to raise the density of actual current, while increasing the amount of product and decreasing the specific consumptions of energy and chemical reactants; and
to use sulphuric acid also at high concentrations, instead of hydrochloric acid, thus enabling an additional economy.

The pretreatment according to the present invention consists of wholly or partially removing hardness and $HCO_3^-$ ions from supply water by passage through cation exchange resins and subsequent degassing or removing $HCO_3^-$ ions only by passage on anionic type of exchange resins, according to the following reactions:

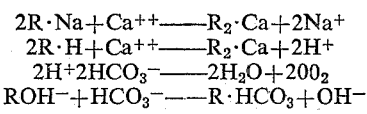

Depending upon hardness/alkalinity ratio, the resins are reactivated either as $R \cdot Na$ at the expense of sodium salts in the salt concentrated drain solution from the electrodialysis plant, or as $R \cdot H$ at the expense of an amount of acid which is less than that heretofore used in the salt concentrate chambers of electrodialysis plants where supply water pre-treatment according to the present invention is not employed.

Thus, for the latter:

(1) It is required that the acid neutralize both the amount of $HCO_3^-$ being transferred from dilute to concentrate chamber and the amount of $HCO_3^-$ in the make-up raw water to the salt concentrate waste stream.

(2) The amount of acid to be added is larger than the stoichiometric amount in order to provide on the concentrated stream side a sufficiently high concentration of $H^+$, so that it may diffuse to the anionic diaphragm.

In the pretreating process according to the present invention, the suply water is divided into two streams A and B: stream A is supplied on hydrogen reactivated resin and the cations in the stream are exchanged for hydrogen ions, stream B is supplied on sodium reactivated resin and softened; the ratios of flows A and B are such that when admixed the full removal of $HCO_3^-$ ion is attained in accordance with the reaction:

Make up water to the salt concentrate stream is never processed. By the passage on the cationic resin, a partial demineralization of supply water is obtained through removal of $HCO_3^-$ ions and $Ca^{++}$ and $Mg^{++}$ ions bonded thereto, thus receiving the load on the electrodialysis unit.

With the removal of bicarbonates and subsequent replacement of a portion of the calcium and magnesium by $Na^+$ ions, because of the following reasons a substantial reduction for the unit resistance is obtained:

(a) $Na^+$ ions exhibit in the solution a higher mobility than $Ca^{++}$ ions and a higher transport number in the diaphragms;

(b) the removal of $HCO_3^-$ ions reduces the concentration polarization on the anionic diaphragm; and (c) as a result of the combined effect of the whole or partial removal of $HCO_3^-$ ions and hardness, the chance for scale forming by reaction with a $Ca^{++}$ on said diaphragm on the concentrated stream side is avoided.

The low total transport number (i.e. the fraction of the total current carried by an ionic species) for $HCO_3^-$ ions, as compared with that for the other anions, is shown by the following experimental results, related to in the table, in which the first line indicates the desalting factor and the second line indicates the corresponding values for the percent ratio between the amount of $HCO_3^-$ ions and total anions in the product:

0.0   0.287   0.584   0.719   0.877
18.0  22.1    26.5    33.    37.7

By way of non-restrictive indication, the result is given for an experiment accomplished on a 10,000 g.p.d. electro-dialysis plan, wherein the plane was first supplied with brackish water, as such, from the subsoil and then with water as processed according to the improved process of the present invention.

Additionally, the pretreatment according to the present invention allows one to utilize substantially higher current densities with a resulting larger production of water and lower consumption of energy: this because of the above resistance reduction and resulting reduction in the applied voltage.

What is claimed is:

1. An apparatus for demineralizing salt water comprising in combination a hydrogen form cation exchanger, a sodium form cation exchanger, means for directing the salt water through said exchangers in parallel flow in a desired proportion, means for combing the effluent streams from each of said cation exchangers in a desired proportion, means for passing said combined stream through the salt diluting chambers of an electrodialysis cell having a plurality of ion-selective membranes defining salt diluting and salt concentrating chambers between end electrodes, means for passing a decomposition voltage across said electrodes and means for withdrawing a concentrated salt stream from the said salt concentrating chambers.

2. The apparatus of claim 1 wherein means are provided for degassifying said combined stream prior to passage of said stream through the salt diluting chambers of said electrodialysis cell.

3. The apparatus of claim 1 wherein means are provided for passing at least a portion of said withdrawn concentrated salt stream through the said sodium form cation exchanger.

4. The apparatus of claim 1 wherein means are provided for passing an acid solution into said hydrogen form cation exchanger.

| Supply, type | Total incoming anions | Total outgoing anions | Flowrate specific acid | | |
|---|---|---|---|---|---|
| | | | M.³/h. | Consump., kwh./m.³ | Consump., gr./m.³ |
| Water as such | 53.0 | 7.50 | 1.55 | 2.11 | 470 |
| Processed water | 44.5 | 7.50 | 2.15 | 1.53 | 345 |

References Cited
UNITED STATES PATENTS

| | | | |
|---|---|---|---|
| 2,502,614 | 4/1950 | Zender | 210—8.5 |
| 2,794,777 | 6/1957 | Pearson | 204—151 |
| 3,056,651 | 10/1962 | McIlhenny et al. | 23—91 |
| 3,063,924 | 11/1962 | Gomella | 204—180 P |
| 3,296,111 | 1/1967 | Miller et al. | 204—180 P |
| 3,383,245 | 5/1968 | Scallet et al. | 127—53 |

JOHN H. MACK, Primary Examiner

A. C. PRESCOTT, Assistant Examiner

U.S. Cl. X.R.

204—180 P